(12) United States Patent
Greb et al.

(10) Patent No.: US 11,878,453 B2
(45) Date of Patent: Jan. 23, 2024

(54) LEAK PROTECTION BUSHING FOR HOTRUNNER MANIFOLD ASSEMBLY

(71) Applicant: Incoe Corporation, Auburn Hills, MI (US)

(72) Inventors: Scott Greb, Washington Township, MI (US); Anton Joerg, Grossostheim (DE); Christian Striegel, Hainburg (DE)

(73) Assignee: Incoe Corporation

( * ) Notice: Subject to any disclaimer, the term of this patent is extended or adjusted under 35 U.S.C. 154(b) by 171 days.

(21) Appl. No.: 17/650,800

(22) Filed: Feb. 11, 2022

(65) Prior Publication Data

US 2022/0161474 A1 May 26, 2022

Related U.S. Application Data

(63) Continuation-in-part of application No. 16/517,616, filed on Jul. 21, 2019, now abandoned.

(51) Int. Cl.
*B29C 45/26* (2006.01)
*B29C 45/28* (2006.01)
(Continued)

(52) U.S. Cl.
CPC .. *B29C 45/2806* (2013.01); *B29C 2045/2775* (2013.01); *B29C 2045/2834* (2013.01); *B29C 2045/2855* (2013.01); *B29K 2101/12* (2013.01)

(58) Field of Classification Search
CPC ........ B29C 45/2806; B29C 2045/2817; B29C 2045/2732; B29C 2045/2762
See application file for complete search history.

(56) References Cited

U.S. PATENT DOCUMENTS 2,773,284 A * 12/1956 Kelly ..................... B29C 45/43
425/437
2,883,707 A * 4/1959 Morin ..................... B29C 45/03
164/262
(Continued)

FOREIGN PATENT DOCUMENTS

| CN | 102006978 | | 4/2011 |
| CN | 108859011 | A | 11/2018 |
| EP | 2679374 | A1 | 1/2014 |

OTHER PUBLICATIONS

International Search Report & Written Opinion dated Oct. 27, 2020 (26 pages).

(Continued)

*Primary Examiner* — Timothy Kennedy
(74) *Attorney, Agent, or Firm* — Gunther J. Evanina; BUTZEL LONG

(57) ABSTRACT

A hotrunner assembly for an injection molding apparatus includes a hotrunner manifold, a nozzle for conveying liquid resin from an outlet of the hotrunner manifold, a valve pin linearly movable within and along a longitudinal axis of the nozzle to control flow of the liquid resin from the outlet of the hotrunner manifold, an actuator for driving the valve pin, a primary seal disposed radially between the valve pin and walls of a bore extending through the hotrunner manifold, and a secondary seal located axially between the hotrunner manifold and the actuator and circumscribing a section of the valve pin to prevent gases or liquid resin from contacting the actuator.

16 Claims, 21 Drawing Sheets

(51) Int. Cl.
  *B29C 45/27* (2006.01)
  *B29K 101/12* (2006.01)

(56) References Cited

U.S. PATENT DOCUMENTS

| | | | | |
|---|---|---|---|---|
| 3,488,810 A * | 1/1970 | Gellert | ......... | B29C 45/281 |
| | | | | 425/563 |
| 3,812,228 A * | 5/1974 | Skoroszewski | ....... | B29C 44/424 |
| | | | | 264/DIG. 83 |
| 4,013,393 A * | 3/1977 | Gellert | ......... | B29C 45/27 |
| | | | | 425/571 |
| 4,026,518 A * | 5/1977 | Gellert | ......... | B29C 45/2806 |
| | | | | 425/566 |
| 4,212,626 A * | 7/1980 | Gellert | ......... | B29C 45/2806 |
| | | | | 425/572 |
| 4,303,382 A * | 12/1981 | Gellert | ......... | B29C 45/30 |
| | | | | 264/328.12 |
| 4,575,328 A * | 3/1986 | Fierkens | ......... | B29C 45/0433 |
| | | | | 425/185 |
| 4,579,520 A * | 4/1986 | Gellert | ......... | B29C 45/2806 |
| | | | | 425/549 |
| 4,588,367 A * | 5/1986 | Schad | ......... | B29C 45/27 |
| | | | | 425/572 |
| 4,682,945 A * | 7/1987 | Schad | ......... | B29C 45/2725 |
| | | | | 425/572 |
| 4,747,770 A * | 5/1988 | Schmidt | ......... | B29C 45/281 |
| | | | | 425/549 |
| 4,929,166 A * | 5/1990 | DiSimone | ......... | B29C 45/1742 |
| | | | | 425/451.3 |
| 5,110,283 A * | 5/1992 | Bluml | ......... | B29C 45/66 |
| | | | | 425/451.7 |
| 5,660,369 A * | 8/1997 | Gauler | ......... | B29C 45/281 |
| | | | | 251/367 |
| 5,670,190 A * | 9/1997 | Osuna-Diaz | ......... | B29C 45/281 |
| | | | | 425/566 |
| 5,695,793 A * | 12/1997 | Bauer | ......... | B29C 45/2806 |
| | | | | 264/328.9 |
| 5,948,450 A * | 9/1999 | Swenson | ......... | B29C 45/30 |
| | | | | 425/562 |
| 6,287,107 B1 * | 9/2001 | Kazmer | ......... | B29C 45/1603 |
| | | | | 425/562 |
| 6,294,122 B1 | 9/2001 | Moss | | |
| 6,299,126 B1 * | 10/2001 | Hughes, II | ......... | B29C 45/374 |
| | | | | 249/103 |
| 6,309,208 B1 * | 10/2001 | Kazmer | ......... | B29C 45/1603 |
| | | | | 425/562 |
| 7,214,048 B2 | 5/2007 | Kim | | |
| 7,686,603 B2 | 3/2010 | Fairy | | |
| 7,753,676 B2 | 7/2010 | Babin | | |
| 9,102,085 B2 | 8/2015 | Bazzo | | |
| 9,346,206 B2 | 5/2016 | Bazzo | | |
| 9,492,960 B2 | 11/2016 | Galati | | |
| 9,498,909 B2 | 11/2016 | Moss | | |
| 2002/0164392 A1 * | 11/2002 | Kazmer | ......... | B29C 45/27 |
| | | | | 425/149 |
| 2004/0089053 A1 * | 5/2004 | Kaminski | ......... | G01N 19/02 |
| | | | | 73/843 |
| 2005/0050975 A1 * | 3/2005 | Sasaki | ......... | B29C 45/00 |
| | | | | 74/413 |
| 2005/0123641 A1 | 6/2005 | Kim | | |
| 2007/0292557 A1 * | 12/2007 | Dewar | ......... | B29C 45/28 |
| | | | | 425/566 |
| 2008/0014296 A1 * | 1/2008 | Tooman | ......... | B29C 45/281 |
| | | | | 425/145 |
| 2008/0088047 A1 | 4/2008 | Trudeau | | |
| 2008/0171100 A1 * | 7/2008 | Bouti | ......... | F16B 43/00 |
| | | | | 425/569 |
| 2008/0199553 A1 * | 8/2008 | Fairy | ......... | B29C 45/281 |
| | | | | 425/146 |
| 2009/0004323 A1 * | 1/2009 | Krummenacher | .... | B29C 45/281 |
| | | | | 425/568 |
| 2009/0061042 A1 * | 3/2009 | Fairy | ......... | B29C 45/2806 |
| | | | | 425/564 |
| 2009/0104307 A1 * | 4/2009 | Ten | ......... | B29C 45/2725 |
| | | | | 425/572 |
| 2009/0142440 A1 | 6/2009 | Babin | | |
| 2009/0148551 A1 * | 6/2009 | Feick | ......... | B29C 45/281 |
| | | | | 425/564 |
| 2009/0291160 A1 | 11/2009 | Tooman | | |
| 2011/0038980 A1 * | 2/2011 | Jenko | ......... | B29C 45/2701 |
| | | | | 425/547 |
| 2016/0082634 A1 | 3/2016 | Tan | | |
| 2018/0079121 A1 | 3/2018 | Lee | | |
| 2018/0186051 A1 | 7/2018 | Lee | | |
| 2020/0254668 A1 * | 8/2020 | Lee | ......... | B29C 45/72 |

OTHER PUBLICATIONS

English Abstract for CN 108859011 A, publication date Nov. 23, 2018 (1 page).
European Search Report dated Aug. 18, 2020 (8 pages).
Synventive Molding Solutions; An ActiveGate Control Technology—Electric Actuation for Superior Part Quality; Publication date unknown (6 pages).

* cited by examiner

LEAK PROTECTION BUSHING FOR HOTRUNNER MANIFOLD ASSEMBLY

CROSS-REFERENCE TO RELATED APPLICATIONS

This application is a continuation-in-part of application Ser. No. 16/517,616, filed Jul. 21, 2019, which is incorporated herein by reference in its entirety.

FIELD OF THE DISCLOSURE

This disclosure pertains to a device for preventing molten resin from leaking from a hotrunner manifold of an injection molding apparatus and into an actuator for driving a hotrunner valve pin.

BACKGROUND OF THE DISCLOSURE

Injection molding systems can be categorized as either hotrunner systems or cold runner systems. In the case of cold runner injection molding systems, channels for the flow of liquid resin are provided in at least one mold part (e.g., mold half) to facilitate delivery of liquid resin to a mold cavity defined by multiple mold parts. After the cavity is filled with liquid resin, the resin is cooled and solidifies or hardens to form a solid injection molded part. The resin inside the channels of the mold part also becomes solid, forming cold runners that are generally recycled or discarded. In a hotrunner system, the channels through which the liquid resin flows to the mold cavity are defined by a heated manifold and heated nozzles that maintain the resin in a liquid state throughout the production process. As a result, cold runners are not produced, substantially eliminating recycling and waste during normal production. Additionally, hotrunner systems provide faster cycle times and higher production rates. Hotrunner systems typically reduce the amount of labor or robotics needed for post-production activities such as runner and sprue removal, discardment and recycling. Thus, although the hotrunner mold systems tend to cost more than cold runner mold systems, the overall production costs per unit (part) can often be substantially less than with cold runner systems.

Known hotrunner injection molding apparatuses have an open space adjacent the valve pin between the actuator and the hotrunner manifold, through which plastic or degassing material can leak by a primary or sleeve seal circumferentially disposed between the valve pin and sleeve retainer. Such materials can enter into and damage or otherwise interfere with effective operation of the actuator.

It is desirable to configure injection molding apparatus employing hotrunners with means for cooling the actuators that control molten resin flow through the nozzles while also providing structure that prevents or reduces leakage of resin toward the actuators.

SUMMARY OF THE DISCLOSURE

The disclosed valve gate assembly for an injection molding apparatus having hotrunners includes a heated manifold defining one or more resin channels for allowing flow of liquid resin from an injection molding machine, one or more hotrunner nozzles that are in fluid communication with a corresponding resin channel, and a valve pin configured for linear movement within and along a longitudinal axis of a corresponding nozzle to control flow of resin from the nozzle into a mold cavity. The valve pin is driven by an actuator located on a cooling block that is mounted on the heated manifold. The cooling block is positioned on the hotrunner manifold and supports the actuator. An opening in the cooling block allows connection of the valve pin to the actuator. A leak protection bushing or primary seal between a wall of the opening and the valve pin helps to prevent leakage of resin.

In certain aspects of this disclosure, a secondary seal disposed in a space axially between the hotrunner manifold and the actuator and radially between the valve pin and a cooling block prevents or at least reduces the risk of plastic or degassing materials leaking by the primary sleeve seal from entering the actuator.

A leakage cap can be added to further reduce the risk of any materials leaking by the primary sleeve seal from reaching the secondary seal.

DETAILED DESCRIPTION

While certain embodiments or aspects of the disclosed leak protection seals are described in connection with injection molding apparatus employing an electric motor, pneumatic or hydraulic actuators may be used in place of the electric actuator unless otherwise indicated.

Figure 1:
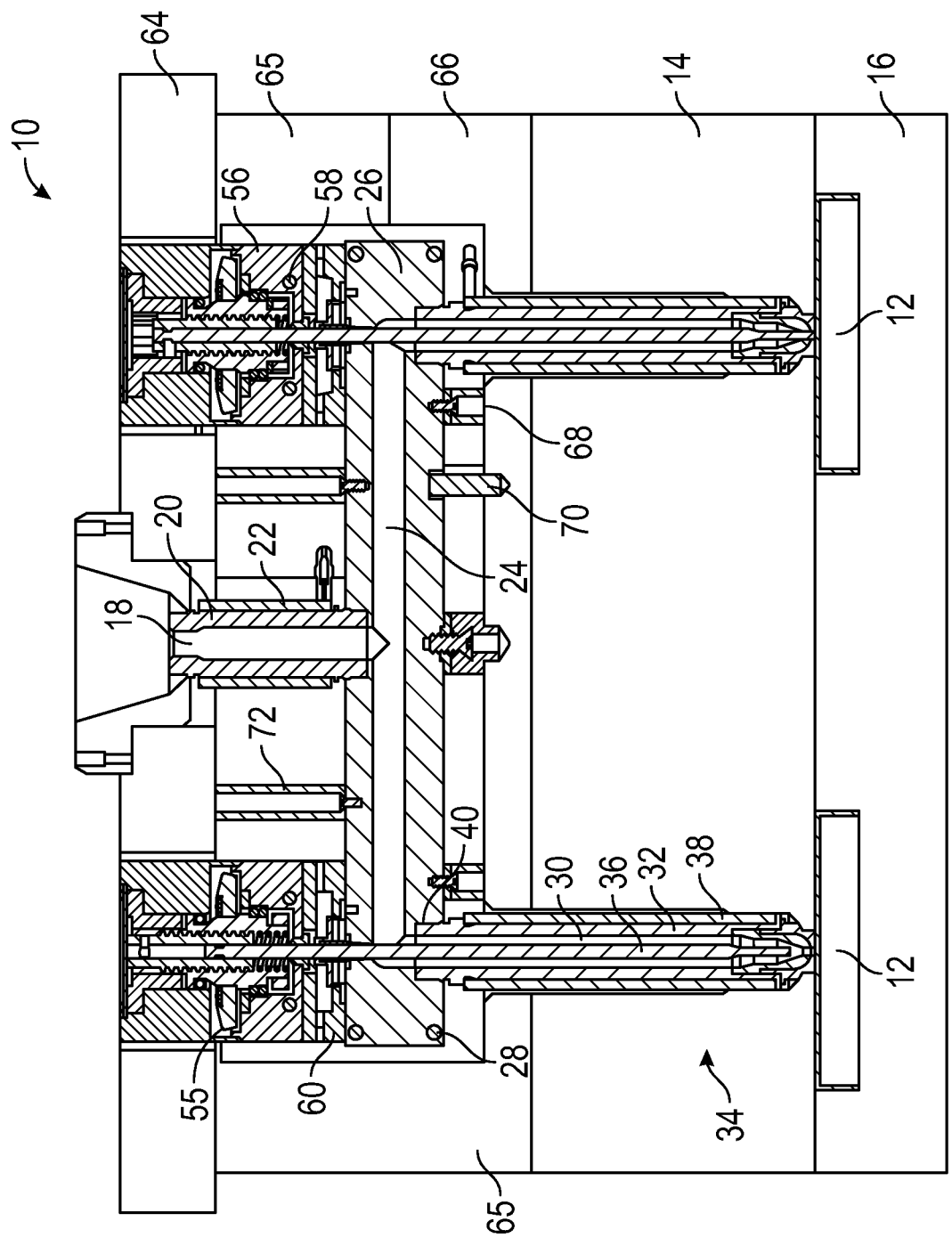
FIG. 1 is a front elevational view of a valve gate assembly in accordance with this disclosure.
Figure 2:
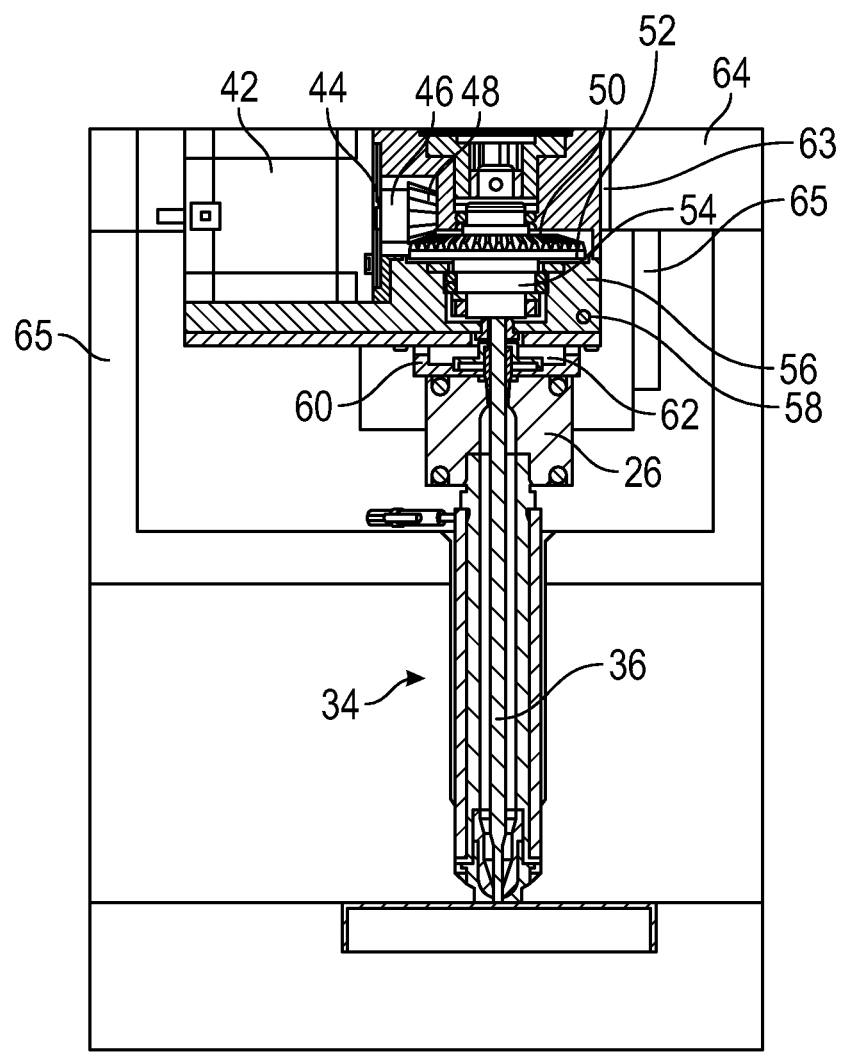
FIG. 2 is a side elevational view of the valve gate assembly shown in FIG. 2.

Shown in FIGS. 1 and 2 is a valve gate assembly 10 for use in delivering liquid resin (typically a molten thermoplastic composition) from an injection molding machine (not shown) to a mold cavity 12 defined by mold plates 14, 16. The resin flows from the injection molding machine into a channel 18 disposed in a sprue bushing 20 heated by electrical resistance heating element 22 and is distributed through manifold channels 24 defined in heated (or heatable) manifold 26. The heated manifold is provided with electrical resistance heating elements 28 capable of maintaining the resin at a desired temperature that facilitates flow. The resin flows from the manifold channels 24 into an annular space 30 defined between internal walls 32 of nozzles 34 and a valve pin 36 that is linearly movable within nozzle 34 along a vertical longitudinal axis of the nozzle between an open position (shown for the nozzle on the left in FIG. 1) and a closed position (shown for the nozzle on the right in FIG. 1). When the valve pin 36 is in the open position, liquid resin flows into mold cavity 12. Nozzles 34 are maintained at a temperature sufficient to keep the resin in a liquid (flowable) state by electrical resistance heating elements 38. Nozzles 34 can be provided with external threads 40 on the inlet end of the nozzle which engage internal threads of a bore through the bottom of manifold 26 to provide a fluid-tight seal. The mold can define a single cavity or multiple cavities, and each cavity can be supplied with resin from a single nozzle or multiple nozzles.

An electric motor 42 (FIG. 2) contained in an actuator housing 43 (FIG. 4) and having a rotating output shaft 44 is mechanically linked to valve pin 36 by a smaller bevel gear or drive gear 46 that has teeth 48 that mesh with teeth 50 of larger bevel gear or driven gear 52 to convert higher speed, lower torque rotation around the horizontally oriented output shaft 44 into lower speed, higher torque rotation along a vertical axis. In certain embodiments, the other types of actuators such as pneumatic or hydraulic, can be employed. The driven gear 52 can be mechanically coupled to a rotational-to-linear converter 54 (e.g., a screw and nut type arrangement) to convert rotational movement into linear (up and down) motion of valve pin 36 along a vertical axis generally coinciding with the longitudinal center line of cylindrical shaped nozzle 34. Gears 46 and 52, along with converter 54 constitute a suitable or preferred transmission assembly 55 for converting rotational movement of a horizontally oriented output shaft from motor 42 into linear vertical movement of valve pin 36. In the preferred embodiments, the gear ratio (i.e., rate of rotation of the drive shaft or gear to the driven shaft or gear) is greater than 2:1, preferably at least 3:1, and more preferably at least 4:1.

Top mold plate 64 is provided with a pocket or recess 63 that helps support the actuator (i.e., motor 42 and transmission). This arrangement also helps draw heat away from the motor and transmission by conduction (i.e., the pocket acts as a heat sink). More specifically, at least one of the electric motor and transmission is in thermal contact with a lower wall or surface of the cavity.

A cooling plate or block 56 having internal channels 58 for circulating a coolant fluid (e.g., water) is mounted or assembled (via spacer plate 60) on manifold 26. The cooling block and spacer plate (or adaptor plate) are entirely supported by and overlap the manifold. Preferably, cooling block 56 is spaced from manifold 26 by spacer plate 60, which can provide an air gap 62 between manifold 26 and cooling block 56 to eliminate direct contact between cooling block 56 and manifold 26 and minimize contact between block 56 and plate 60. The thickness of spacer plate 60 (i.e., the distance between the top of manifold 26 and bottom of cooling block 56) can be from about 0.25 inch to about 2 inches. In general, greater thickness is preferred to better thermally isolate motor 42 from the heated manifold 26, while less thickness is desired to provide a more compact molding apparatus with overall dimensions of the apparatus remaining relatively unaffected by the novel arrangement. In certain embodiments, spacer plate 60 can be a material resistant to conductive heat transfer. For example, certain stainless steels and titanium alloys have a thermal conductivity less than 20 W/mK. Certain ceramic materials can have even lower thermal conductivity.

Cooling block 56 is located in a space generally bounded by a top mold plate 64 and an intermediate mold plate 66 that includes perimeter or side walls 65 that surrounds the manifold, cooling blocks and at least portions of the transmission and motor.

Assembly 10 also includes various lower support elements 68, dowels 70, and upper support elements 72 for facilitating proper alignment and spacing of the components of the assembly.

Figure 3:
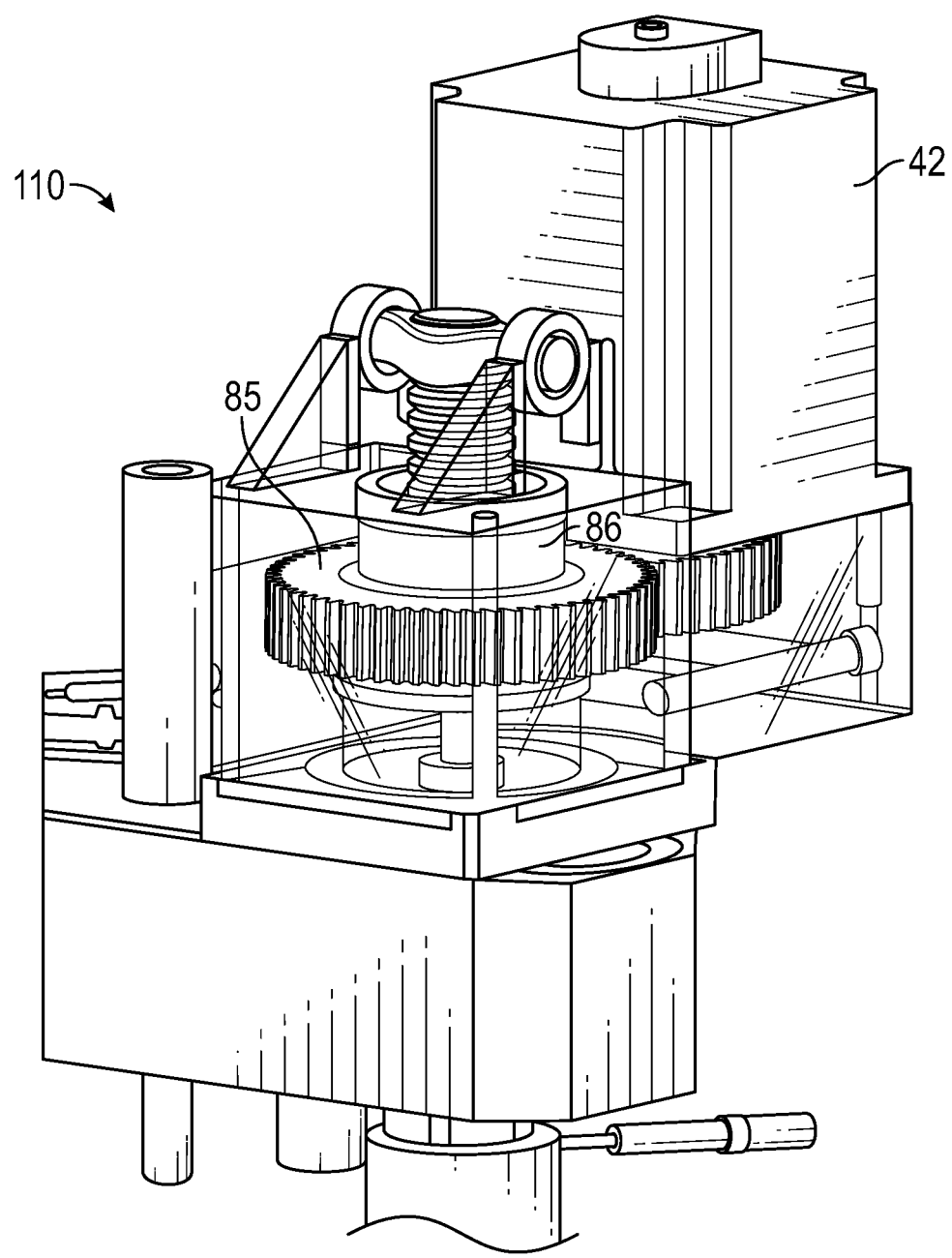
FIG. 3 is a perspective view of another embodiment of the disclosed valve gate assemblies.
Figure 5:
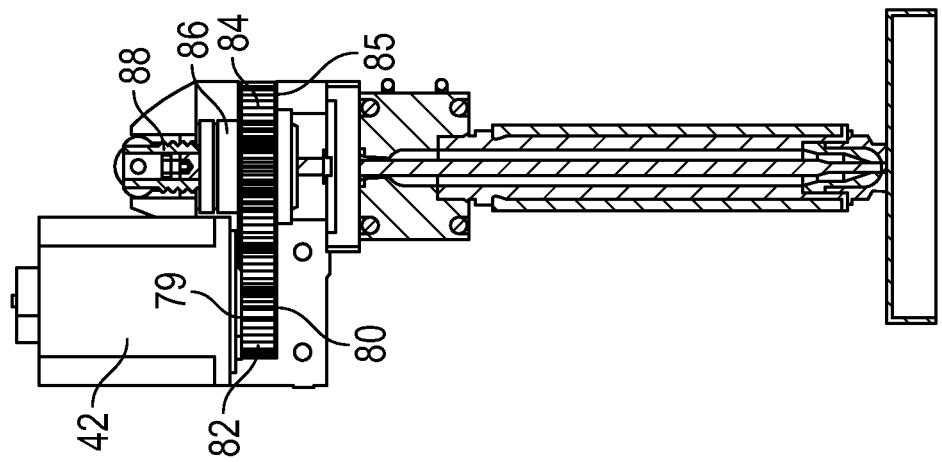
FIG. 5 is a side elevational view of the valve gate assembly shown in FIGS. 3 and 4.
Figure 4:
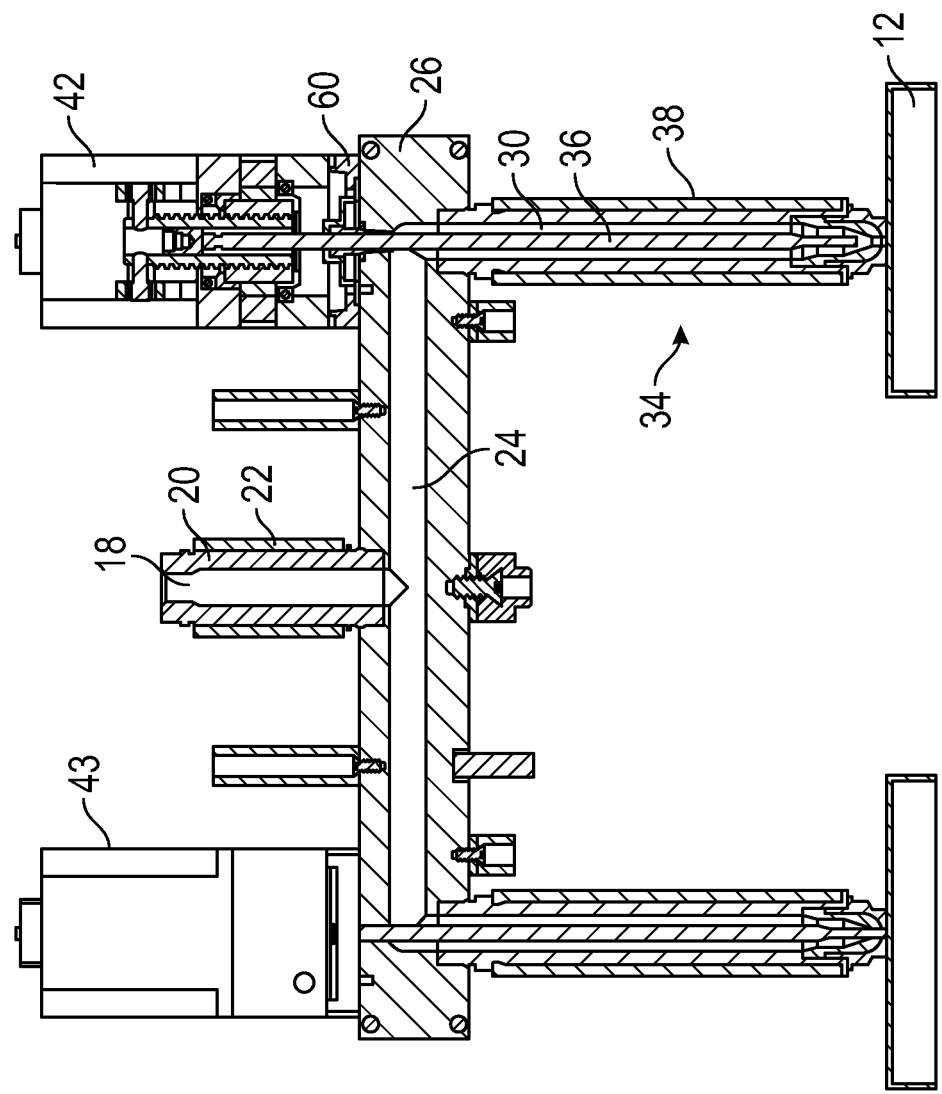
FIG. 4 is a front elevational view of the valve gate assembly shown in FIG. 3.

Shown in FIGS. 3-5 is an alternative embodiment 110 in which the motor 42 is arranged such that the output shaft 79 is vertically oriented and has a smaller gear 80 having teeth 82 that engage teeth 84 on a larger gear 85 to convert higher speed, lower torque rotation from output shaft 79 to lower speed, higher torque rotation of gear 85 and an associated shaft or hub 86. The transmission assembly may also include a rotation-to-linear motion conversion device 88 (e.g., a screw and nut type arrangement in which one of either the screw or nut is fixed) for converting the rotational movement of hub 86 into linear movement of valve pin 36. The assembly 110 is otherwise generally similar to assembly 10, with common or similar components having the same reference numerals as with the embodiment of FIGS. 1 and 2. Mold plates and other components that are not shown in FIGS. 3-5 can be, and preferably are, the same or similar to those shown in FIGS. 1 and 2.

Figure 6:
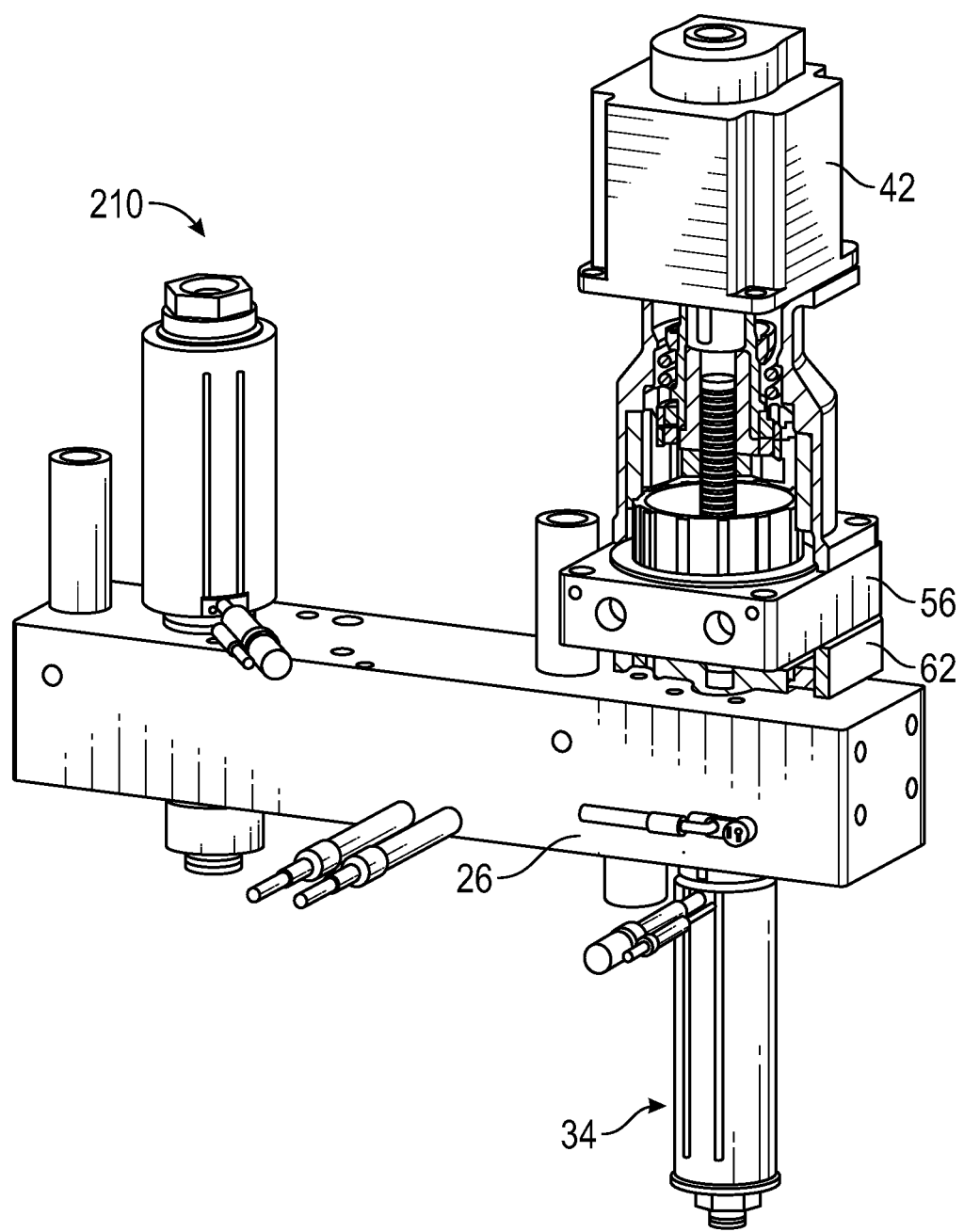
FIG. 6 is a perspective view of a third embodiment of the disclosed valve gate assemblies.
Figure 7:
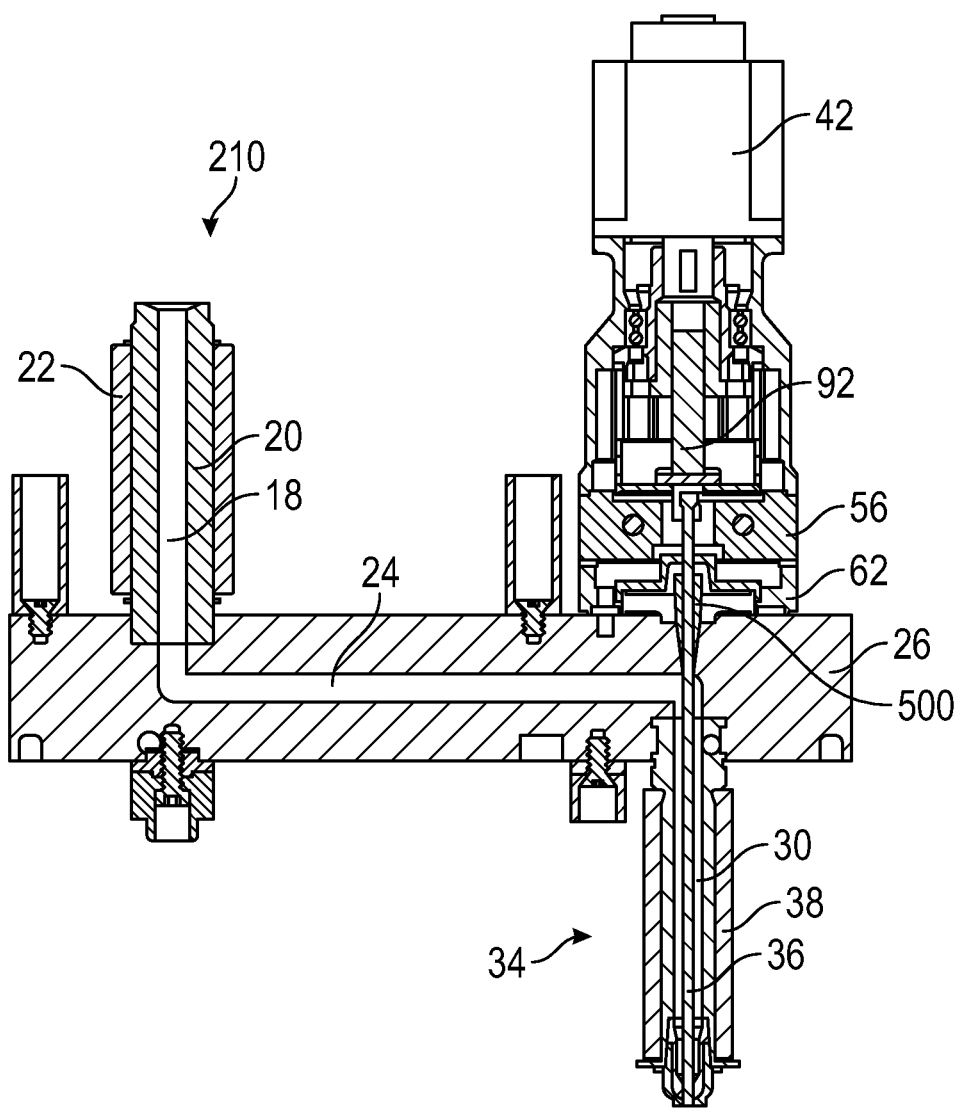
FIG. 7 is a front elevational view of the valve gate assembly shown in FIG. 6.

Shown in FIGS. 6 and 7 is another alternative embodiment 210 in which motor 42 is arranged such that the output shaft is axially aligned with valve pin 36 and directly coupled to a rotary to linear converter 92 coupled to valve pin 36 to provide a transmission assembly in which rotary output from the motor is translated into linear motion for moving valve pin 36 upwardly and downwardly with bore channel 30 of nozzle 34. In this embodiment, a single manifold channel 24 facilitates flow of liquid resin to a single nozzle 34. However, generally any number of manifold channels and nozzles can be provided, the illustrated embodiments being a relatively simple design to facilitate understanding of the concepts and devices disclosed herein. Except as otherwise noted, the components of embodiment 210 are generally similar to or identical to those described with respect to the first and second embodiments 10 and 110, with such components being numbered as in the preceding embodiments.

FIG. 7 also shows a primary seal 500 disposed in an annular space between valve pin 36 and walls of a pin opening or bore through manifold 26.

Figure 8:
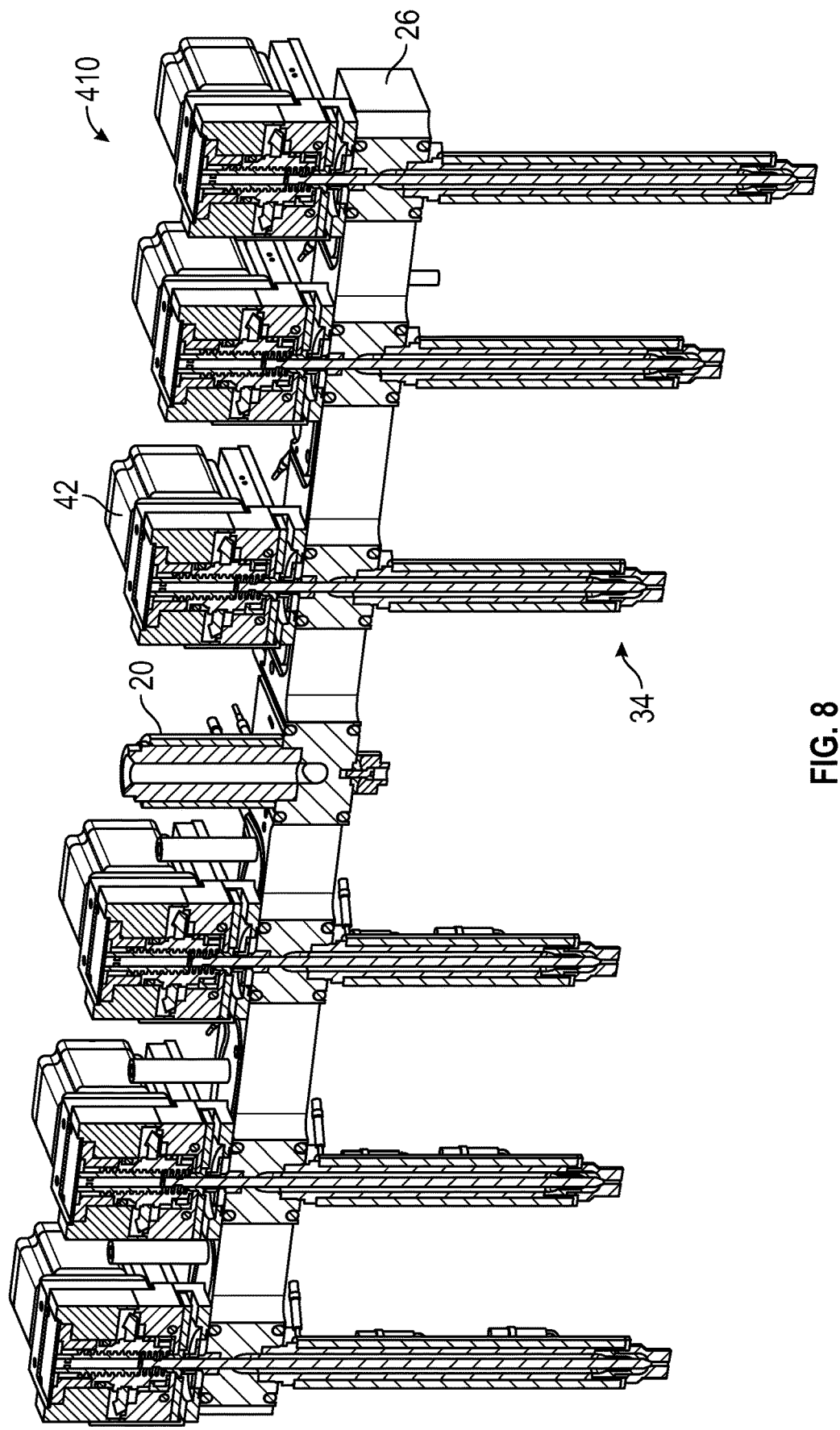
FIG. 8 is a perspective view of a fourth embodiment of the disclosed valve gate assemblies.

Shown in FIG. 8 is another embodiment 410 having six motors 42 and nozzles 34. The various valve pins 36 can be driven at different velocities (e.g., v3>v2>v1) to deliver resin to different mold cavities or to different inlets of the same mold cavity of different rates. The individual velocities can be constant or can vary (accelerate and/or decelerate) independently. Also, the opening and closing speeds can be different at each nozzle. This ability to precisely control resin flow differently to different parts of the mold cavity can be tuned to optimize production quality and/or production rate.

Figure 12:
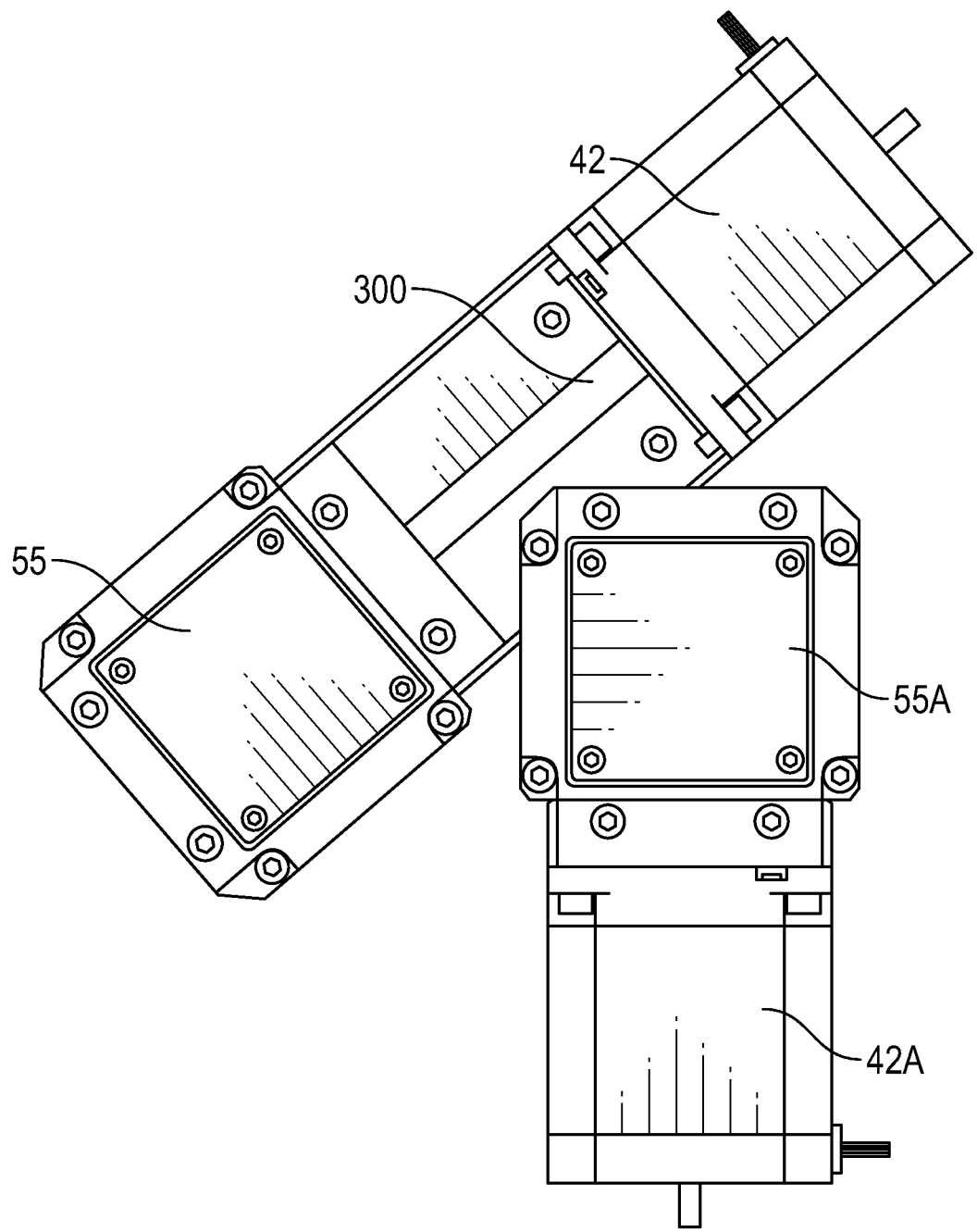
FIG. 12 is a top plan view showing the relative positions of two motors and associated transmissions assembled on a molding apparatus.

In certain applications, it may be desirable to use an extended or elongated motor shaft 300 (FIG. 12) to create a space between the transmission assembly 55 and motor 42 to create a space that allows positioning of a second motor 42A and transmission 55A in closer proximity to motor 42 and transmission 55 than would otherwise be possible. This allows greater flexibility for positioning nozzles in the molding apparatus.

Figure 9:
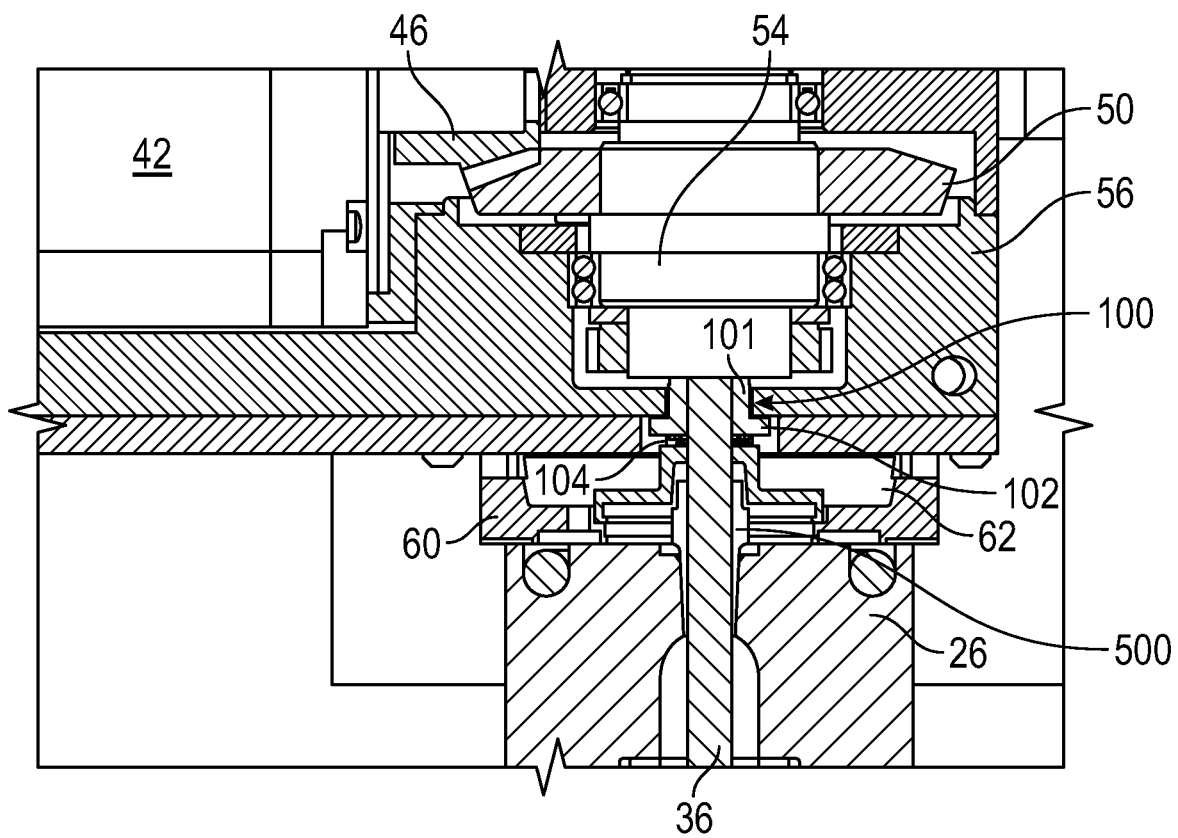
FIG. 9 is an enlarged cross-sectional view of a portion of the gate assembly shown in FIG. 2.
Figure 10:
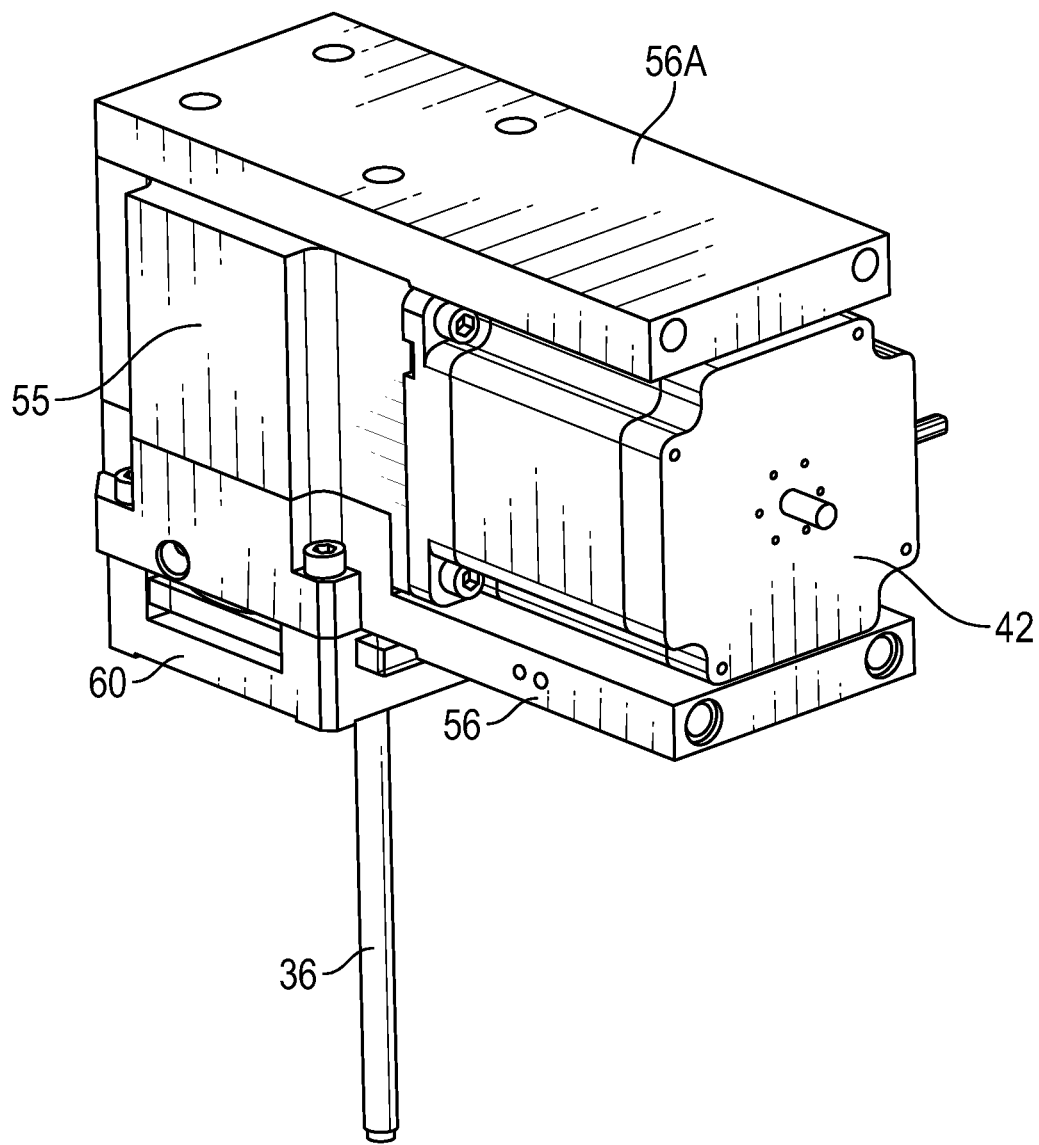
FIGS. 10 and 11 are perspective views of the motor and transmission shown in FIG. 2 having modified cooling arrangements.
Figure 11:
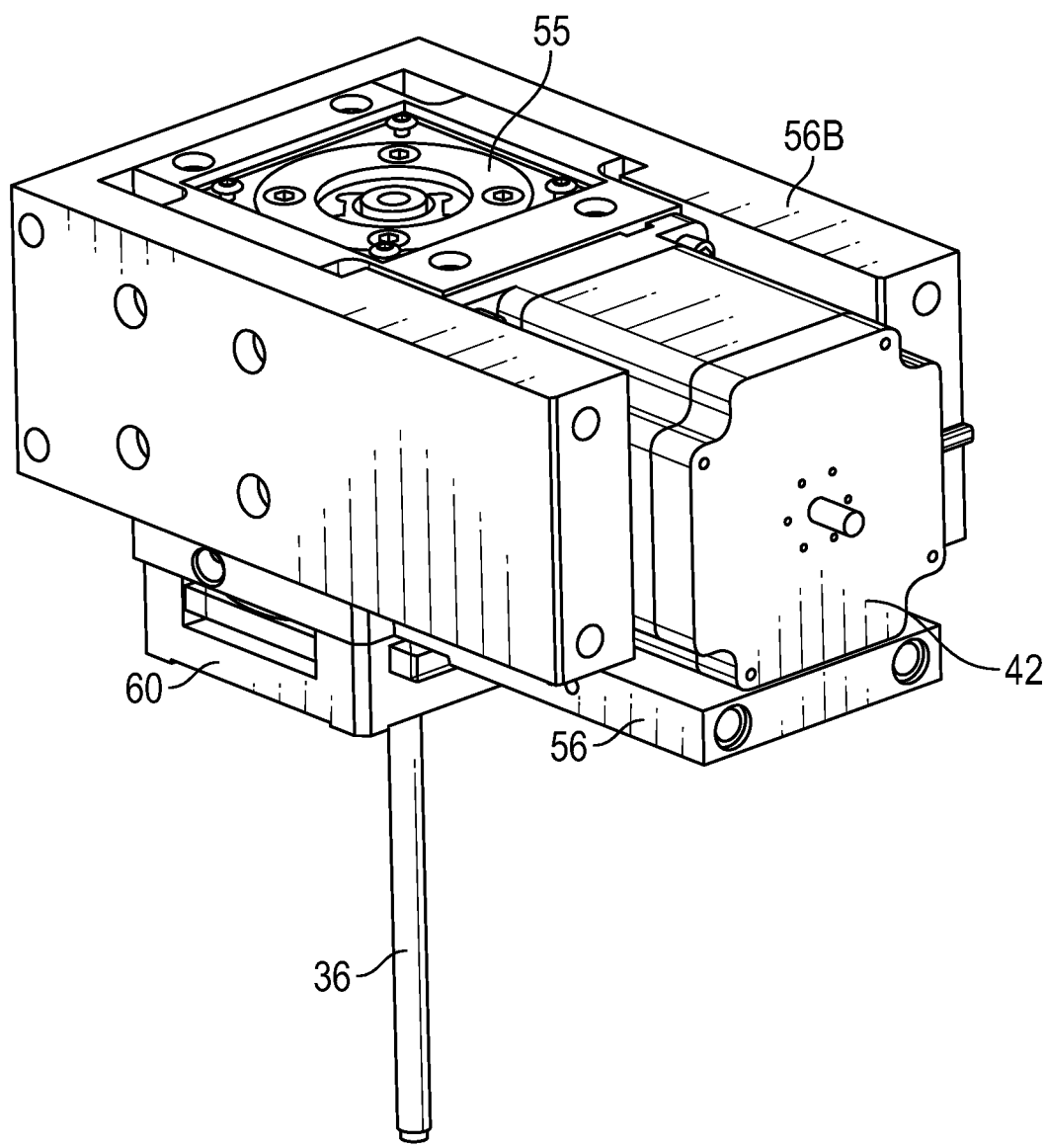

As best illustrated in FIG. 9, a leak protection bushing or secondary seal 100 defines an annular collar-like structure 101 having a flange portion 102 that provides a seal between a valve pin opening through cooling block 56 and valve pin 36. Secondary seal 100 can offer the potential additional advantage of being in direct contact with the valve pin to draw heat away from the valve pin and any leaking resin, making it more difficult for the cooling resin to leak. Secondary seal 100 is urged against a valve pin opening through cooling block 56 to prevent plastic fluid from leaking into the actuator or transmission (e.g., gears and/or converter). For example, a spring washer 104 can be used to urge bushing 100 against the valve pin opening. In the illustrated embodiments, cooling block 56 is supported on manifold 26 (via spacer plate 60) and supports both motor 42 and the transmission assembly. However, it will be appreciated that multiple cooling blocks can be used (e.g., a first cooling block for the transmission assembly and a second cooling block for the motor). FIG. 2 shows only a single cooling block 56 disposed between spacer block 60 and the transmission assembly 55 (e.g., comprised of gears 46 and 48). However, in certain applications, it may be desirable to add an upper cooling block 56A (FIG. 10), a side cooling block 56B (FIG. 11) or a combination of both a side cooling block 56A and an upper cooling block 56B can be used together with the lower cooling block 56.

Figure 13:
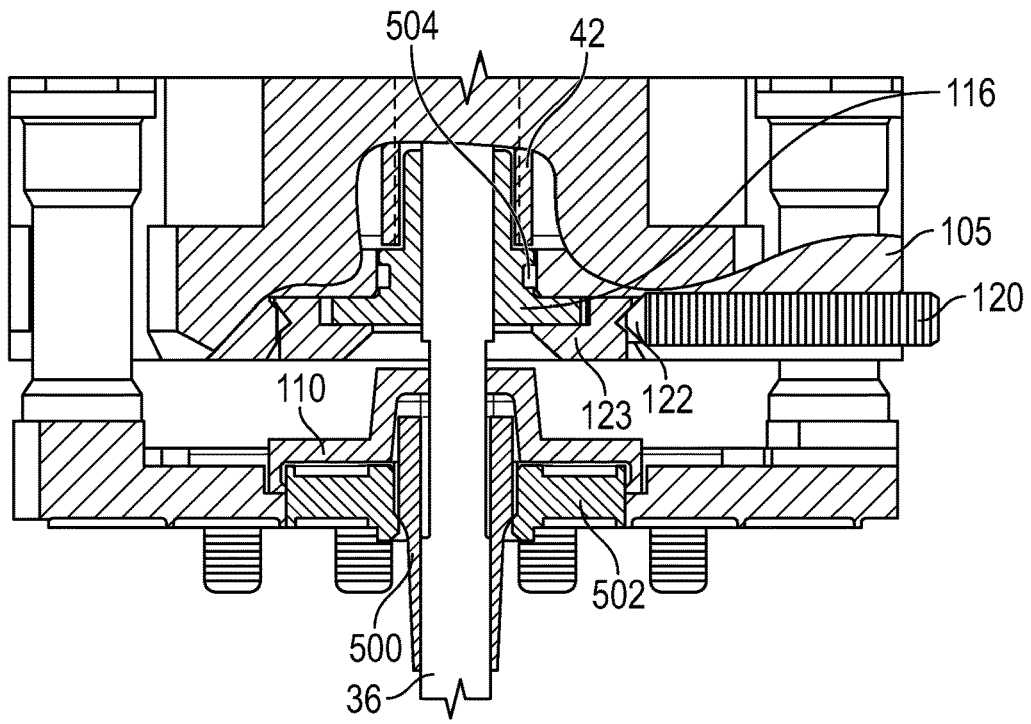
FIG. 13 is a cross-sectional view of an actuator having a gas seal, leakage cap and sleeve seal for preventing gases and/or molten material from leaking into the actuator body.

Shown in FIG. 13 is an arrangement for preventing gases and/or molten material from entering into or contacting actuator 42. The arrangement employs a primary seal 500 disposed between valve pin 36 and a primary seal retainer 502. A secondary seal 116 is disposed within and seals with a tight tolerance a space defined axially between the valve pin 36 and inner circumferential walls of the actuator 42 and/or a cooling block 56, and axially between a leakage cap 110 and actuator 42. Leakage cap 110 provides a supplemental or tertiary seal to prevent any materials that leak past the primary seal from reaching the secondary seal. Leakage cap 110 is axially disposed between primary seal 500 and secondary seal 116, and radially disposed between valve pin 36 and spacer plate 60. An elastomeric O-ring 504 may be located in a circumferential groove between secondary seal 116 and cooling block 56 or actuator housing 42. Secondary seal 116 is located between manifold 26 and actuator 42, and is spaced from manifold 26 to prevent conductive heat transfer from manifold 26 to secondary seal 116. A leakage cap 110 may be employed in combination with gas seal 116 (as shown in FIG. 13) to provide redundant and/or complementary means for preventing gases and/or molten thermoplastic material from entering actuator 105. A set screw 120 that can be slightly offset moves holding disc 123 and presses disc 123 against housing 43 or cooling block 56.

Figure 14:
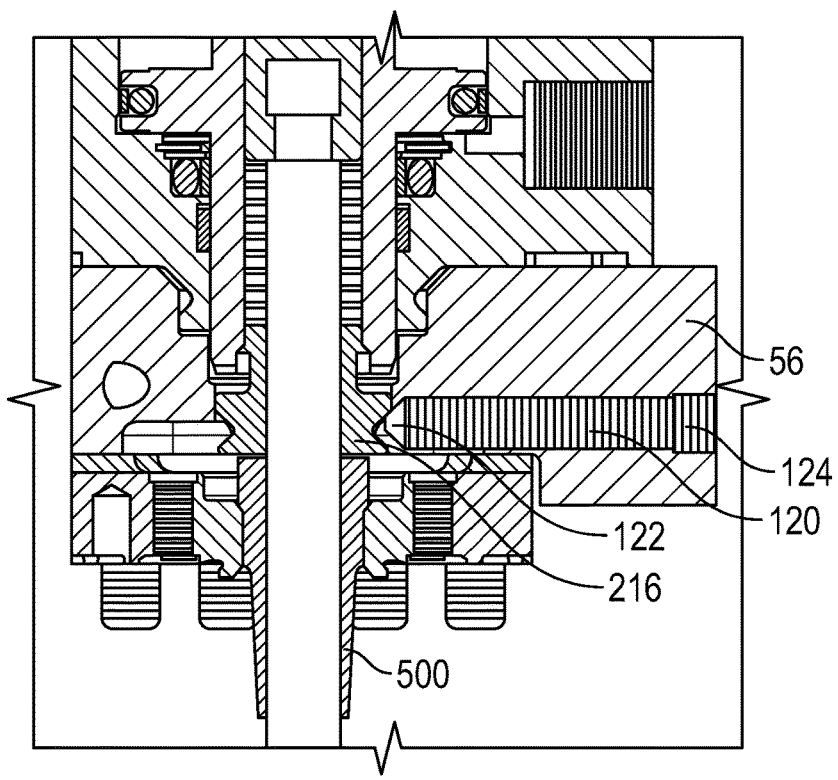
FIG. 14 is a cross-sectional view of an actuator having a gas seal held in place with a screw.

As illustrated in FIG. 14, gas seal 216 can be held in place using a set screw 120 that extends along a threaded bore through actuator body 105 or cooling block 56 and has a tip 122 that engages a circumferential groove or notch recessed into the side of the gas seal 216.

Figure 15:
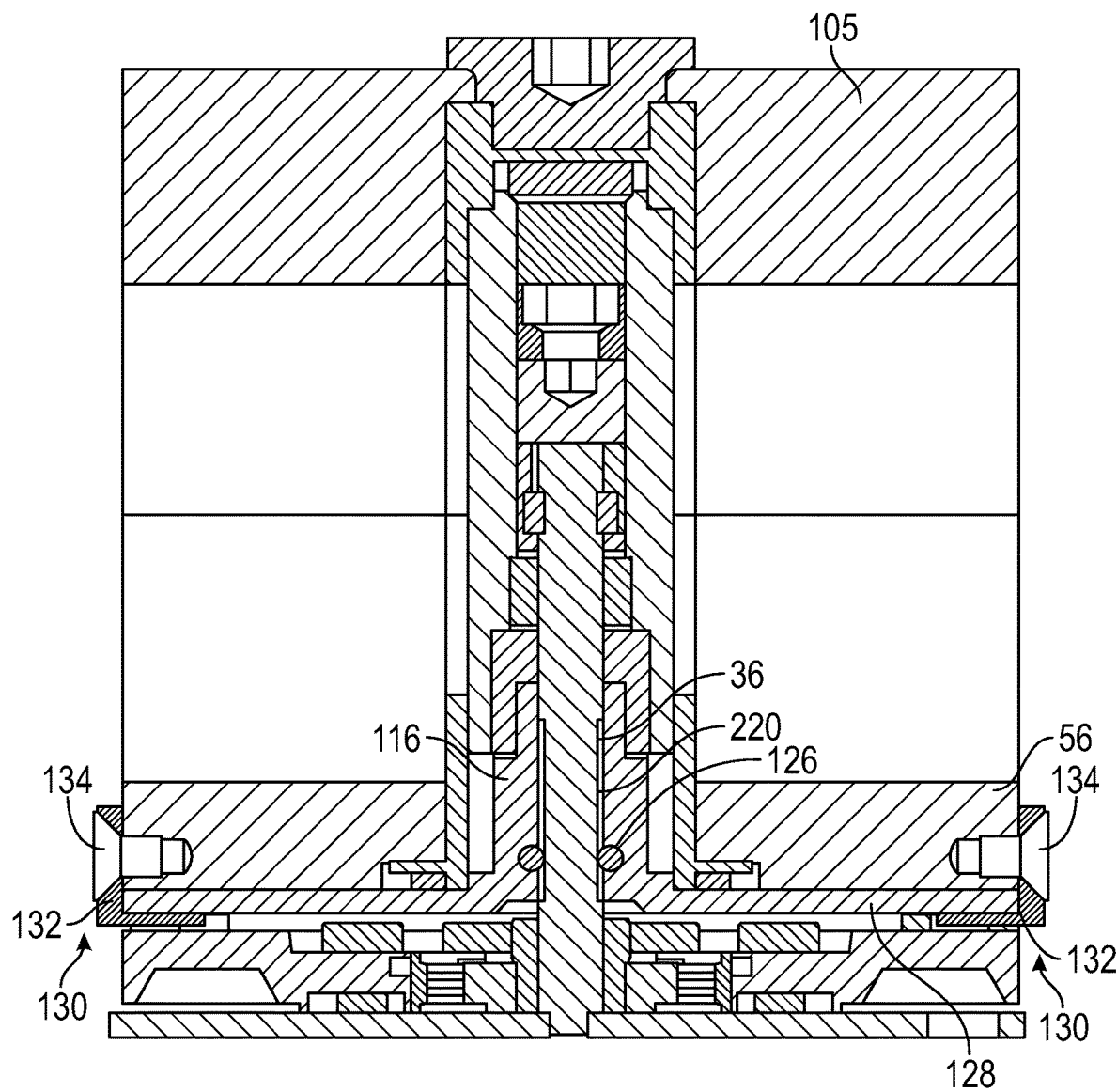
FIG. 15 is a cross-sectional view of an actuator having an anti-rotation feature that is integrated into a gas seal to prevent rotation of a valve pin with respect to the actuator.
Figure 16A:
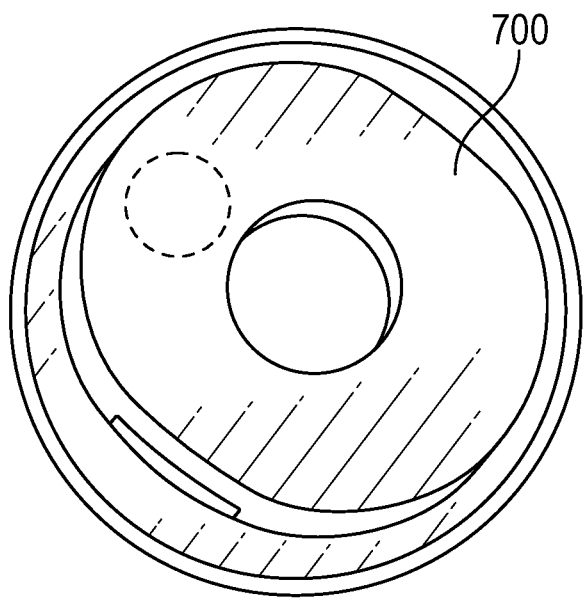
FIG. 16A is a perspective view of a secondary seal in the form of a leakage insert that fits into a recess of a cooling block.
Figure 16B:
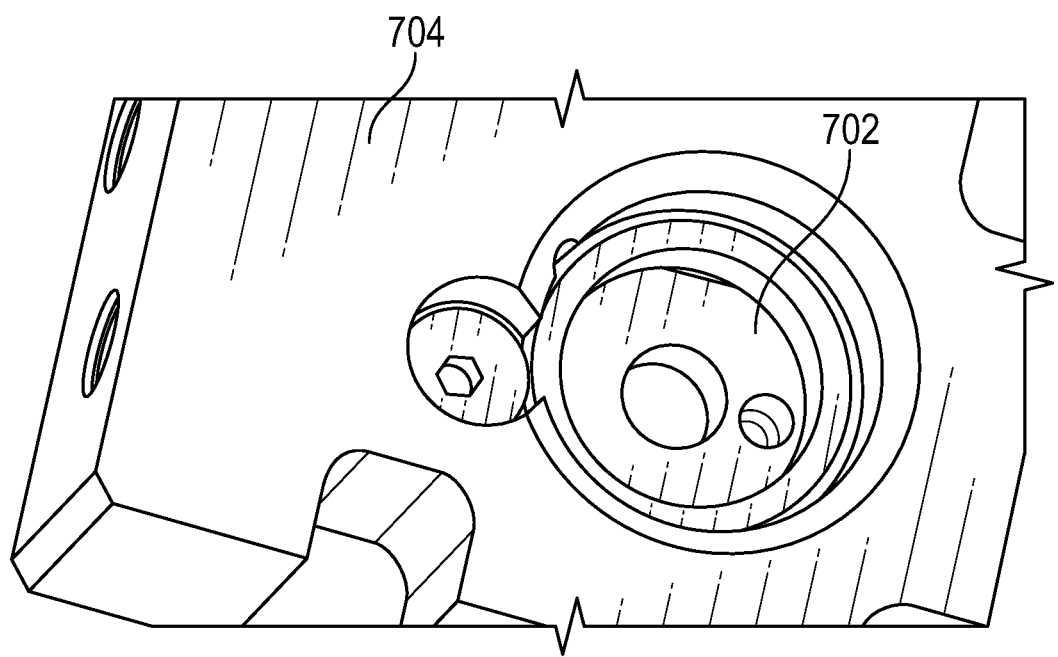
FIG. 16B is a perspective view of a cooling block configured to receive the insert shown in FIG. 16A.
Figure 17B:
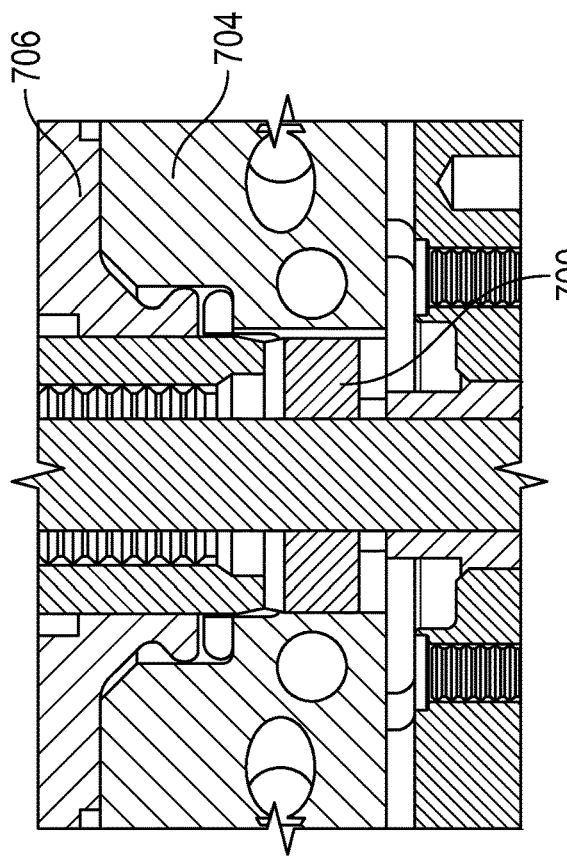
FIGS. 17A and 17B are cross-sectional views of the insert and cooling block shown in FIGS. 16A and 16B used with an actuator for a hotrunner assembly.
Figure 17A:
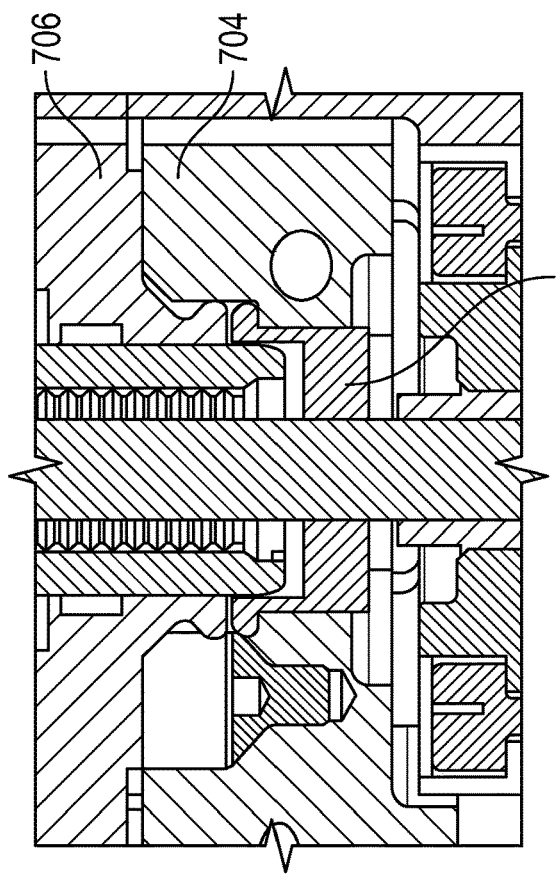

As shown in FIG. 15, an anti-rotation feature 126 can be integrated into gas seal 116. Feature 126 could, for example, be a pair of opposing dowels that engage opposing flat surfaces 220 on opposite sides of valve pin 36, thereby preventing rotation of valve pin 36. Gas seal 116 can have a lower flange 128 that is coextensive with the lower surface of cooling block 56 or actuator body 105 (in the event that a cooling block is not used). A clamp arrangement 130 employing a shoe 132 held to actuator body 105 or cooling block 56 using a screw 134 received in a corresponding threaded bore can be used to hold gas seal 116 while allowing slidability of the gas seal relative to the actuator 105 and/or cooling block 56.

Shown in FIGS. 16A, 16B, 17A and 17B is a leakage insert 700 (a type of secondary seal) sized and shaped to fit tightly within a recess 702 in an underside of a cooling block 704 to prevent plastic or degassing materials from entering or contacting actuator 706.

Figure 18:
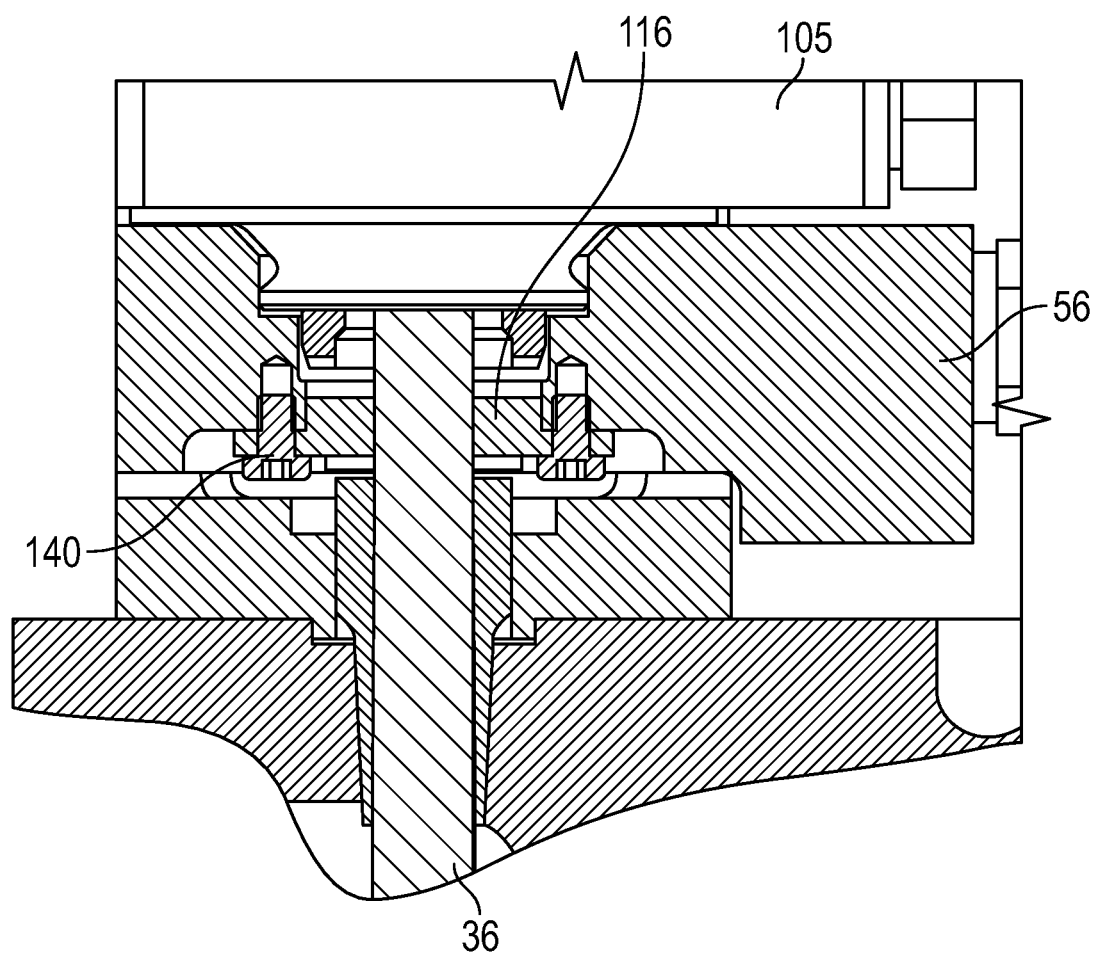
FIGS. 18 and 19 show a secondary seal attached to the cooling block and actuator, respectively, using a threaded fastener, such as a socket head cap screw.
Figure 19:
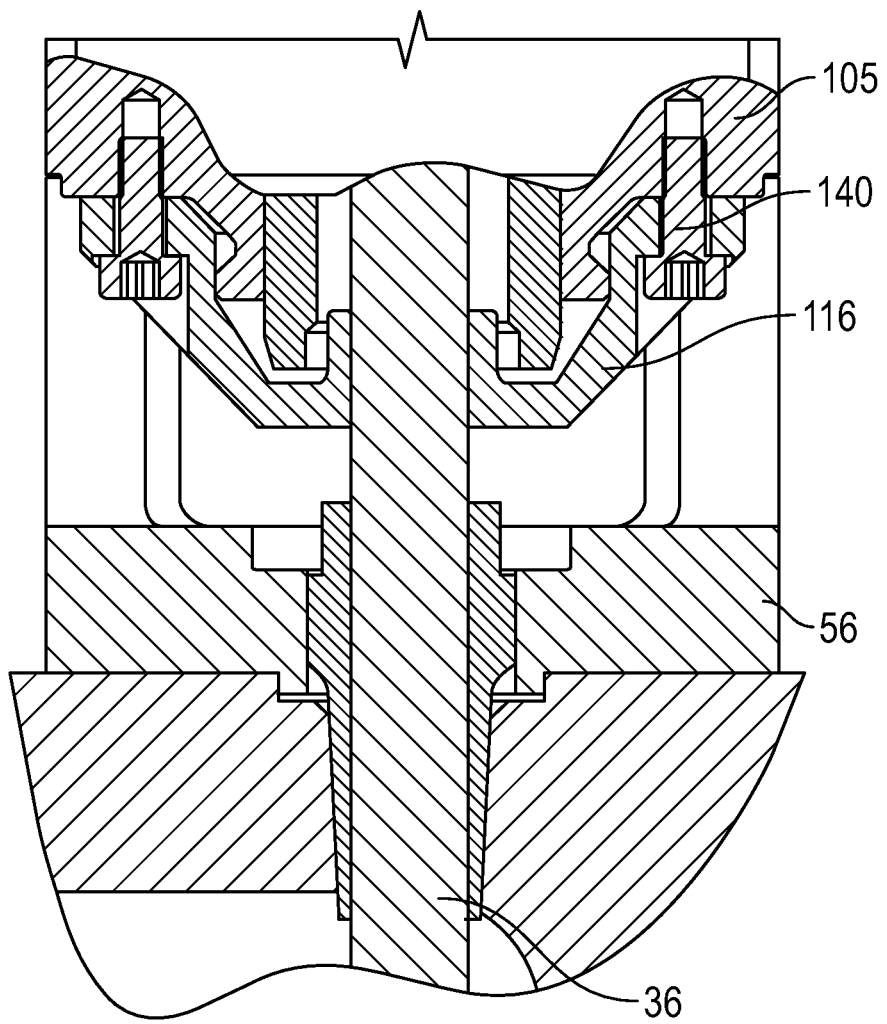
Figure 20:
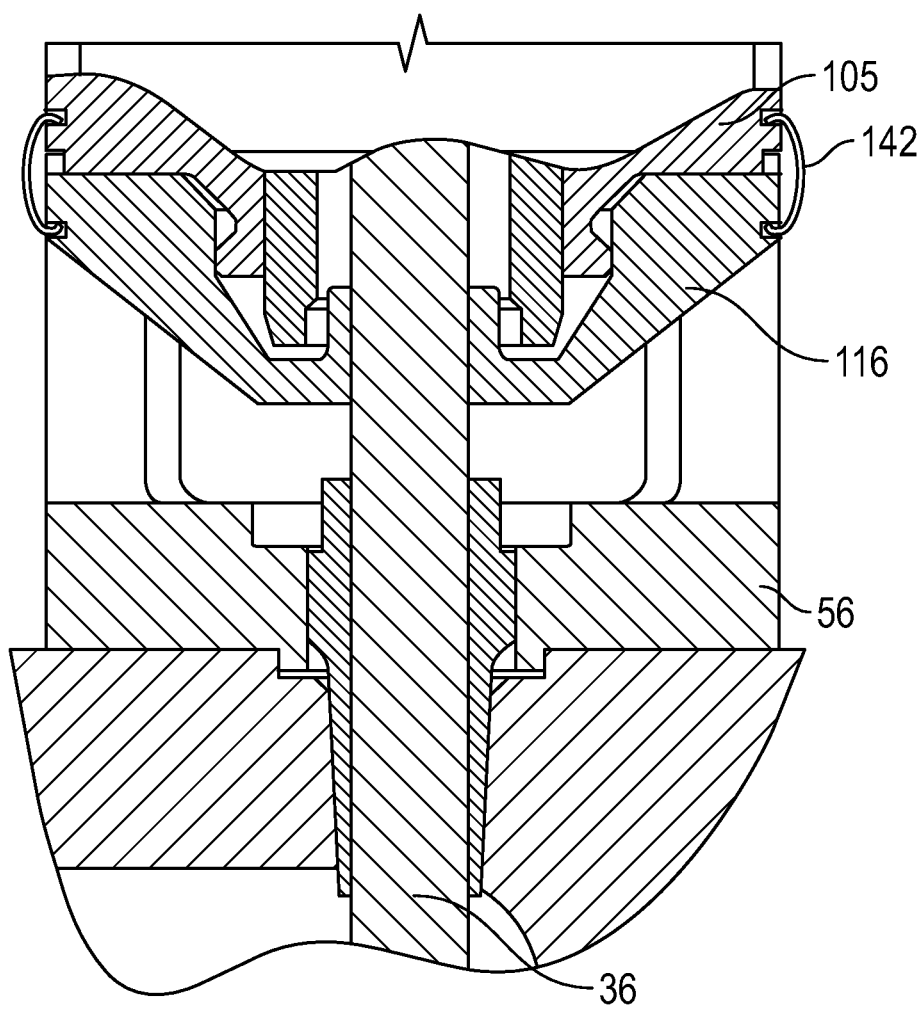
FIG. 20 shows a secondary seal attached to an actuator using clips.
Figure 21:
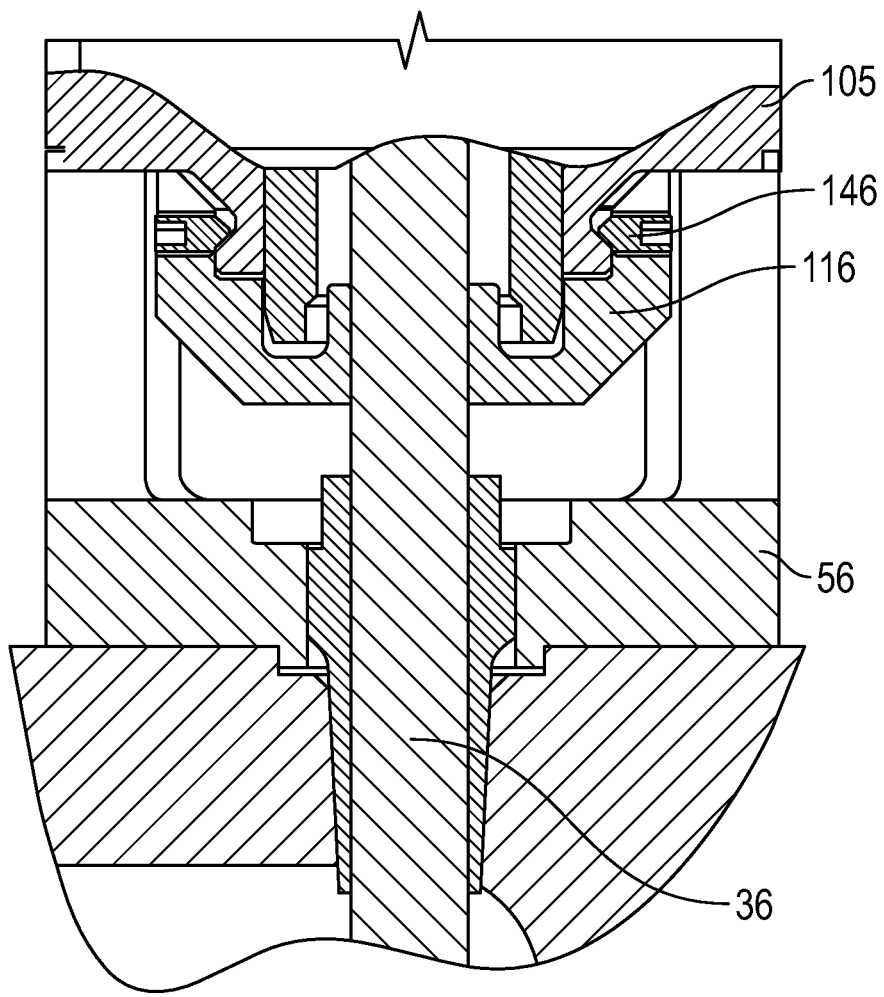
FIG. 21 shows a secondary seal attached to an actuator using set screws.
Figure 22:
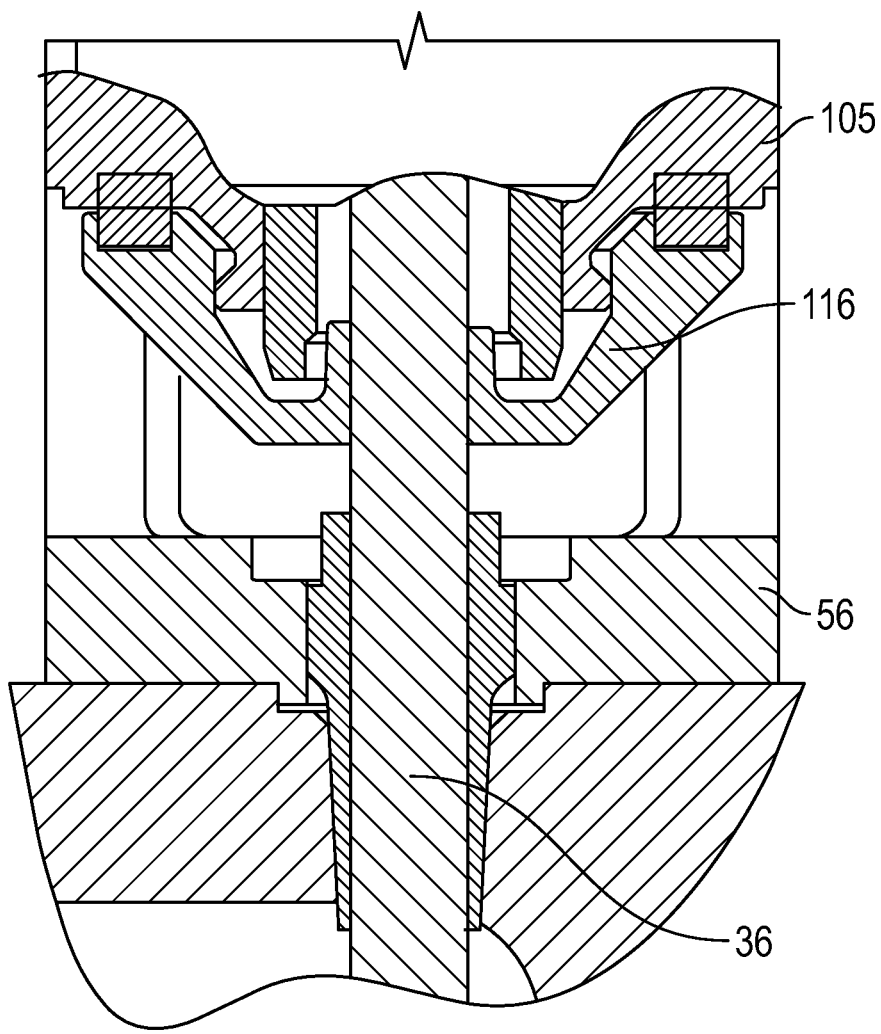
FIG. 22 shows a secondary seal attached to an actuator using magnets that pull the secondary seal toward the actuator housing.
Figure 23:
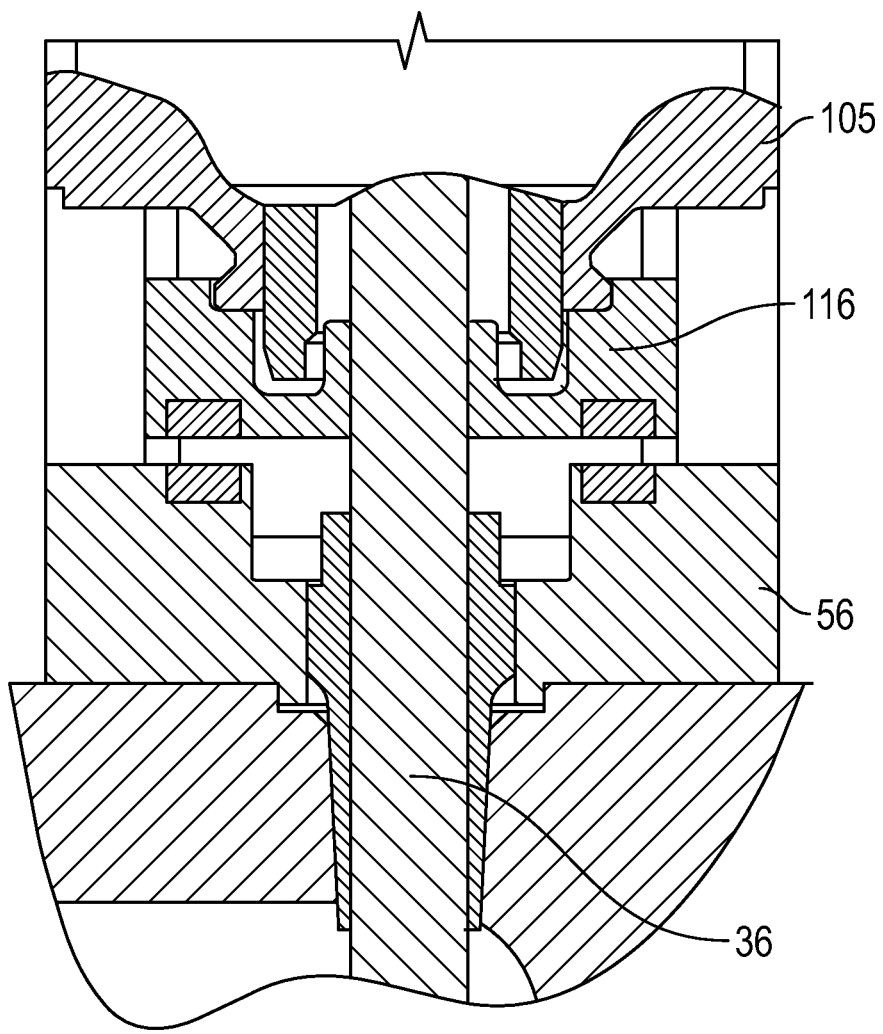
FIG. 23 shows a secondary seal attached to an actuator using magnets that push the secondary seal toward the actuator housing.

In various embodiments, gas seal (secondary seal 102, 116, 216) can be attached to cooling block 56 or actuator 105 (FIGS. 18 through 23) using threaded fasteners (such as socket head cap screws) 140 (FIGS. 18 and 19), clips 142 (FIG. 20), set screws 146 (FIG. 21), or magnets 137 (FIGS. 22 and 23).

The arrangement or embodiments described herein provide a compact mold design that facilitates mounting of electric motors and transmission assemblies on the hotrunner manifold and within the space provided for the manifold by the design of the assembled mold plates. The use of electric motors that are cooled within the space generally provided for the hotrunner manifold provides precise and reliable adjustment of the value pin position and movement, which has advantages in terms of production rates, quality and reduced waste and damage.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

What is claimed is:

1. A hotrunner assembly for an injection molding apparatus, comprising:
   a hotrunner manifold defining a channel for conveying liquid resin from an inlet to at least one outlet;
   a nozzle disposed on the manifold for conveying the liquid resin from the outlet to a mold cavity;
   a valve pin linearly movable within and along a longitudinal axis of the nozzle to control flow of the liquid resin into the mold cavity;

an actuator for driving the valve pin;

a primary seal disposed radially between the valve pin and walls of a bore extending through the hotrunner manifold; and a secondary seal located axially between the hotrunner manifold and the actuator, the secondary seal spaced from the hotrunner manifold to prevent conductive heat transfer from the hotrunner manifold to the secondary seal, and the secondary seal circumscribing a section of the valve pin to prevent gases and/or liquid resin from contacting the actuator.

2. The assembly of claim 1, further comprising a cooling block between the actuator and the manifold, and wherein the secondary seal has a collar portion disposed between the valve pin and an opening through the cooling block, and a flange portion that extends away from the opening along an outer wall of the cooling block.

3. The assembly of claim 2, further comprising a spring urging the flange portion of the leak protection bushing against the outer wall of the cooling block adjacent the opening in the cooling block.

4. The assembly of claim 1, wherein the actuator is an electric motor.

5. The assembly of claim 1, wherein the actuator is a pneumatic or hydraulic actuator.

6. The assembly of claim 1, wherein the secondary seal is held in place by a screw.

7. The assembly of claim 1, wherein the secondary seal has an anti-rotation feature that engages surfaces of the valve pin to prevent rotation of the valve pin with respect to the actuator.

8. The assembly of claim 7, wherein the anti-rotation feature comprises opposing dowels that engage opposing flat surfaces om the valve pin.

9. The assembly of claim 1, further comprising a leakage cap axially disposed between the primary seal and the secondary seal, and radially disposed between the valve pin and a spacer plate.

10. The assembly of claim 1, further comprising an O-ring seal disposed in a groove between the secondary seal and a cooling block or the actuator.

11. The assembly of claim 2, wherein the secondary seal is an insert sized and shaped to sealingly fit within a recess in an underside or top of the cooling block.

12. The assembly of claim 2, wherein an O-ring is located in a circumferential groove between the secondary seal and the cooling block.

13. The assembly of claim 1, wherein the secondary seal is held to a cooling block or the actuator using threaded fasteners.

14. The assembly of claim 1, wherein the secondary seal is held to a cooling block or the actuator using clips.

15. The assembly of claim 1, wherein the secondary seal is held to a cooling block or the actuator using set screws.

16. The assembly of claim 1, wherein the secondary seal is held to a cooling block or the actuator using magnets.

* * * * *